United States Patent [19]

Rabinowitz et al.

[11] 4,096,403

[45] Jun. 20, 1978

[54] SUPERCONDUCTING HYBRID MAGNETIC FLUX PUMP

[75] Inventors: Mario Rabinowitz, Menlo Park; Thomas J. Rodenbaugh, Cupertino, both of Calif.

[73] Assignee: Electric Power Research Institute, Inc., Palo Alto, Calif.

[21] Appl. No.: 700,282

[22] Filed: Jun. 28, 1976

[51] Int. Cl.$^2$ .................................................. H02K 9/00
[52] U.S. Cl. ................................. 310/10; 310/40 R; 310/52; 335/216; 336/DIG. 1
[58] Field of Search .............. 310/10, 40, 52, 191; 335/216; 336/DIG. 1; 307/306; 308/10

[56] References Cited

U.S. PATENT DOCUMENTS

| | | | |
|---|---|---|---|
| 3,007,057 | 10/1961 | Brennenman | 336/DIG. 1 |
| 3,090,023 | 5/1963 | Brennenman | 336/DIG. 1 |
| 3,098,189 | 7/1963 | Buchhold | 307/306 |
| 3,182,275 | 5/1965 | Newhouse | 308/10 |
| 3,402,307 | 9/1968 | Pearl | 310/10 |
| 3,504,283 | 3/1970 | Meservey | 307/306 |

OTHER PUBLICATIONS

"Superconducting D.C. Generator", Electrical Review, p. 22, 1/3/64.

"The Principle & Performance of a Super Cond. Dynamo", J. Van Suchtelen et al., Cryogenics, 10/65.

*Primary Examiner*—R. Skudy
*Attorney, Agent, or Firm*—Townsend and Townsend

[57] ABSTRACT

A flux pump having a closed superconducting circuit including wire of relatively high critical field and a gate defining a current-carrying path through a coil, the latter being moveable relative to a magnetic field source to cause normal conduction of current in a plurality of gate modules of a relatively low critical field in the circuit at spaced locations along the same. Thus, a flux pumping action occurs in the coil as the modules are subjected to the field of the source. The modules are separated from each other by strips of insulation material and the wire, connected to opposite ends of the gates, passes through adjacent insulation strips in a manner such that the current flow in the circuit is always in the same direction. The speed of the flux pumping action can be increased by having several groups of modules arranged in parallel with each other and excited simultaneously with a number of modules in each group being in series with each other. A plurality of gates properly connected within a module also increases the rate of excitation or de-excitation of the flux pump.

28 Claims, 6 Drawing Figures

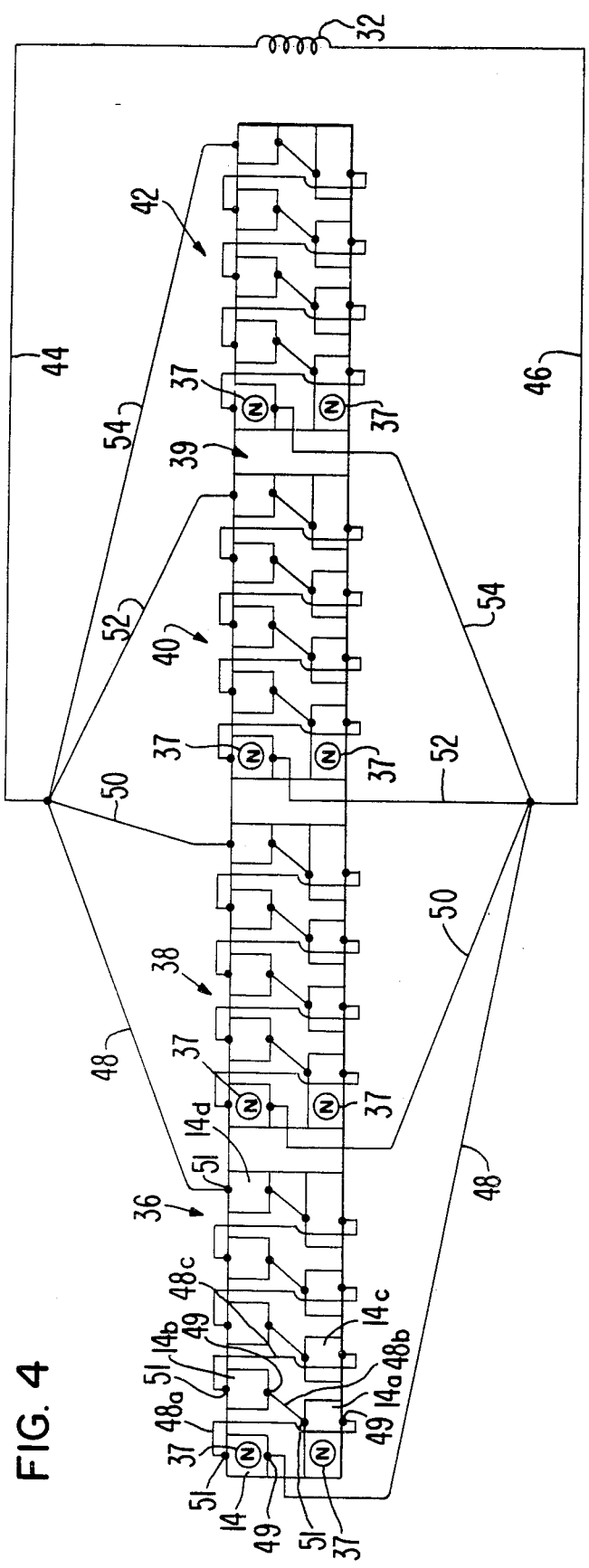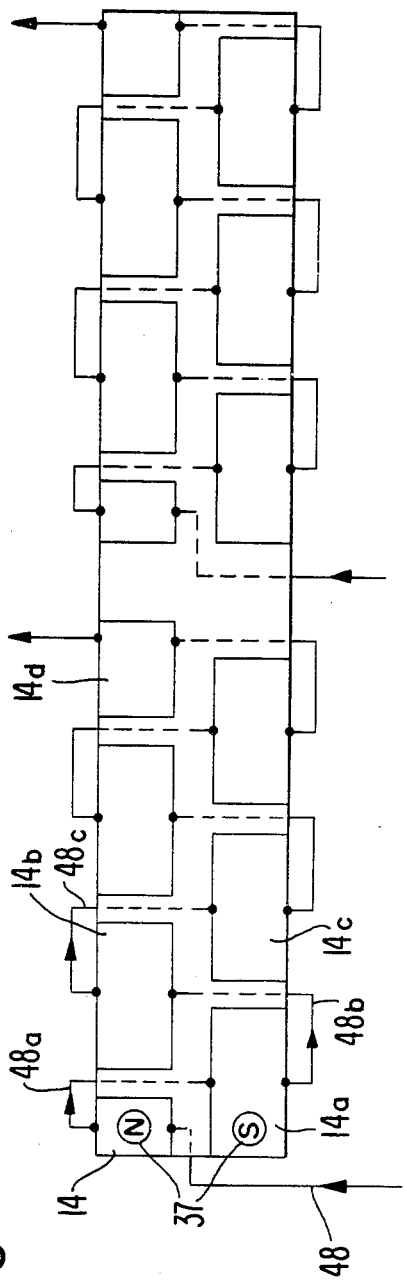
FIG. 4
FIG. 6

4,096,403

SUPERCONDUCTING HYBRID MAGNETIC FLUX PUMP

This invention was made under contract with or supported by the Electric Power Research Institute, Inc.

This invention relates to improvements in superconducting magnetic flux pumps and, more particularly, to a flux pump which, in operation, increases the rate of flux pumping by minimizing the formation of counterproductive transient currents and by increasing the rate of entry and exit of flux into the superconducting circuit.

BACKGROUND OF THE INVENTION

Superconductivity in materials allows a large magnetic field to be produced in a circuit containing a superconducting coil by the use of a relatively small source of magnetic field through a magnetic flux pumping action which requires no electrical connection between the source field and the recipient field. Disclosures about superconducting magnetic flux pumps have been made in the following references:

1. "Flux Pumps and Superconducting Solenoids", Van Beelen et al., Physica 31, 413 (1965).
2. "The Principle and Performance of a Superconducting Dynamo", Suchtelen, et al., Cryogenics, 256 (1965).

The concept of superconducting magnetic flux pumps gives rise to the possibility of energizing the rotating field coil of an AC generator without the use of brushes, slip-rings or contacts of any kind. This concept therefore avoids the interface problems of a superconducting-to-normal transition for a superconducting field coil. It also avoids the problem of excessive evaporation of liquid helium caused by high current input leads. It also presents a means for the rapid de-excitation of the field coil to prevent its quench (loss of superconductivity) in the event of a serious fault. The latter advantages would also accrue to the superconducting field coil of a DC generator and more generally to any superconducting electromagnet.

Magnetic flux pumps which use the property of a superconducting circuit to trap magnetic flux have been known for well over ten years. This invention uses this property by simultaneously and sequentially introducing magnetic flux through gates embodying a modular design. The sequential excitation is in synchronism with the magnetic source field. Conventional flux pumps generally are constructed with a single gate, usually a thin superconducting foil in which a small transient area is caused to conduct current in a normal fashion during the flux trapping or pumping process. The gate may also be made in forms other than thin foils, such as an assembly of parallel wires, as long as the gate's critical field is relatively less than other parts of the circuit.

The idea of using a fluid pumping action to energize a superconducting field coil has previously been proposed although there has been no completely satisfactory solution to this problem before the conception of the present invention. The main problem associated with conventional magnetic flux pumps is the fact that, as a proper electrical current is induced in one portion of a superconducting circuit, electrical currents will be induced in other portions and these latter currents (countercurrents) flow in the opposite direction to that which is desired. This results in inefficiencies and, because of the "persistence" of supercurrents, will require a relatively longer time for the complete excitation or de-excitation of the magnetic field in a field coil. This is due to the fact that the currents flowing in the opposite direction must be overcome and a longer time is required for this purpose. As a result of these shortcomings, a need has arisen for an improved flux pump which is highly efficient in its pumping action; yet is relatively simple in construction.

Another problem with prior art magnetic flux pumps relates to their non-optimal gatig action which also limits the rate of excitation or de-excitation of the field coil. The present invention has the advantageous feature of multiple sequential introduction of flux in a given module to overcome this problem.

SUMMARY OF THE INVENTION

The present invention satisfies the aforesaid need by providing an improved magnetic flux pump which is constructed to provide much shorter excitation or de-excitation times than is capable with conventional flux pumps. This is accomplished by eliminating the undesirable transient or countercurrent flows in the flux pump itself as well as by providing a more efficient method of pumping flux. In addition, the present invention has other advantageous features, including the multiple sequential introduction of magnetic flux in a given module of a group of spaced gate modules, the design of the flux pump in an azimuthal modular arrangement to reduce the number of source poles, and the axial modular design of a rotatable, cylindrical array of gates and modules, i.e., the rotor, to allow a single rotor to have a relatively high magnetic flux capacity.

To this end, the flux pump of the present invention is constructed of a superconducting circuit in which there is motion relative to a source of magnetic field, i.e., the circuit or the source of magnetic field moves relative to the other. The circuit is comprised of superconducting wire of relatively high critical field and is provided with a number of spaced superconducting gate modules of relatively low critical field along the length of the wire. The wire passes through or around insulation between the gate modules in a manner to cause electrical current through the circuit to flow always in the same direction as the circuit moves relative to a source of magnetic field, such as by rotation of the circuit or the magnetic field. Thus, the flow of transient countercurrents is eliminated to hereby decrease the time of excitation or de-excitation of an inductance coupled with the circuit, to thereby avoid the inefficiencies mentioned above with respect to conventional flux pumps.

The invention can take the shape of a cylinder rotatable about a central axis relative to a fixed magnetic field source. The cylinder can have a number of circumferentially extending groups of gates in modular form arranged in parallel relationship to increase the speed of pumping of flux, each group having a number of gate modules in series with each other. The magnetic field source itself can be one or more permanent magnets arranged at the side of the cylinder. If a number of magnets are used, they can be placed in an axial circumferential arrangement around the cylinder.

The primary object of this invention is, therefore, to provide an improved magnetic flux pump forming a superconducting circuit with relative motion to a source of magnetic field wherein the circuit is constructed to cause electrical currents to flow only in one direction to thereby eliminate transient currents and minimize the time required for excitation or de-excitation of a coil coupled with the circuit. The relative motion may be provided by moving the circuit, the source field, or by travelling wave excitation of a stationary set of source coils.

Another object of the present invention is to provide a magnetic flux pump of the type described wherein the circuit includes a plurality of spaced superconducting gate modules of relatively low critical field at various locations along a circuit including wires of relatively high critical field with the wires passing within one gate module and the next adjacent module through an insulating strip in a manner to assure that current to the inductance will always be in the same direction to thereby prevent the formation of transient countercurrents.

Another object of the present invention is to provide a magnetic flux pump of the type described wherein there is a plurality of superconducting gates within a module, each gate having a pair of opposed upstream and downstream ends and a current path extending between said ends, thus allowing the rapid excitation and de-excitation of the pumped field.

Another object of the present invention is to provide a magnetic flux pump of the type described wherein the superconducting circuit is in the form of a rotor of a generator with the rotor being mounted for rotation relative to the magnetic field source and the rotor being coupled to the field coil of the generator so that magnetic flux can be pumped into the circuit without the need for brushes, sliprings or the like, and the time required for the excitation or de-excitation of the field coil is kept to a minimum.

Other objects of this invention will become apparent as the following specification progresses, reference being made to the accompanying drawings for an illustration of the invention.

IN THE DRAWINGS

FIG. 4 is a folded out schematic view of the parallel-series arrangement of a plurality of gate modules shown as thin foils;

FIG. 6 is a schematic view similar to FIG. 4 but showing the configuration when alternate polarities of a pair of magnetic field sources are used.

Figure 1:
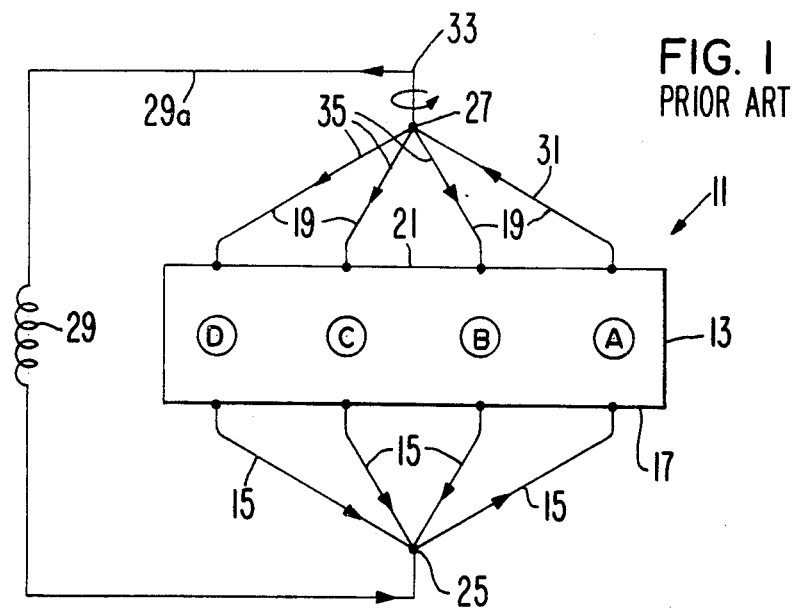
FIG. 1 is a side schematic view of a typical superconducting magnetic flux pump of the prior art.

A typical superconducting magnetic flux pump of the prior art is illustrated in FIG. 1 and broadly denoted by the numeral 11. This flux pump includes a single superconducting foil gate 13 in a continuous strip forming a ring, only the side view of the ring being shown in FIG. 1. Flux pump 11 has a number of wires or electrical conductors 15 extending from a junction 25 to the foil and being connected thereto at various circumferentially spaced locations at one margin 17 thereof. A like number of wires or electrical conductors 19 leave the foil at the opposite margin 21 thereof and becomes joined at a junction 27. A wire 29a interconnects the junctions 25 and 27 of wires 15 and 19. A coil 29 is connected to wire 29a.

Gate 13 moves or rotates relative to a fixed source of magnetic field or the source field moves relative to the foil when the latter is fixed in place. The source field moves relative to and along the circumferential length of foil 13 and successively assumes the various positions denoted by numerals A, B, C, D and so forth about the foil. When the source field is at position A, a current denoted by arrow 31 is generated which flows toward junction 27 from the foil; however, at junction 27, the current splits up and a portion flows toward and into wire 29a denoted by the arrow 33 and portions also flow into the other wires 19 as denoted by the arrows 35. The currents denoted by arrows 35 are counterproductive in the sense that they flow back to the foil and are in a direction opposite to the direction of the current induced in the second line 19 when the source field is at position B. These countercurrents reduce the net current flowing to coil 29.

The division of current between parallel resistanceless paths is approximately inversely proportional to the self-inductance of these paths. Owing to the relatively larger self inductance of coil 29, a significant amount of transient countercurrent may be generated. Also, the rate of excitation or de-excitation is limited by the rate of entry and exit of the flux from the gate. As the source field moves continuously from position A to B to C to D and so forth, the above described production of currents and transient countercurrents occurs sequentially at the various wires 19. Having the same number of source poles as the number of segments between the conductors 19 in FIG. 1 would help to avoid the countercurrents. However, this would not be as efficient a method as taught in the present invention, wherein the objects of both increased gating rate and prevention of countercurrents are achieved as described hereinafter.

Figure 2:
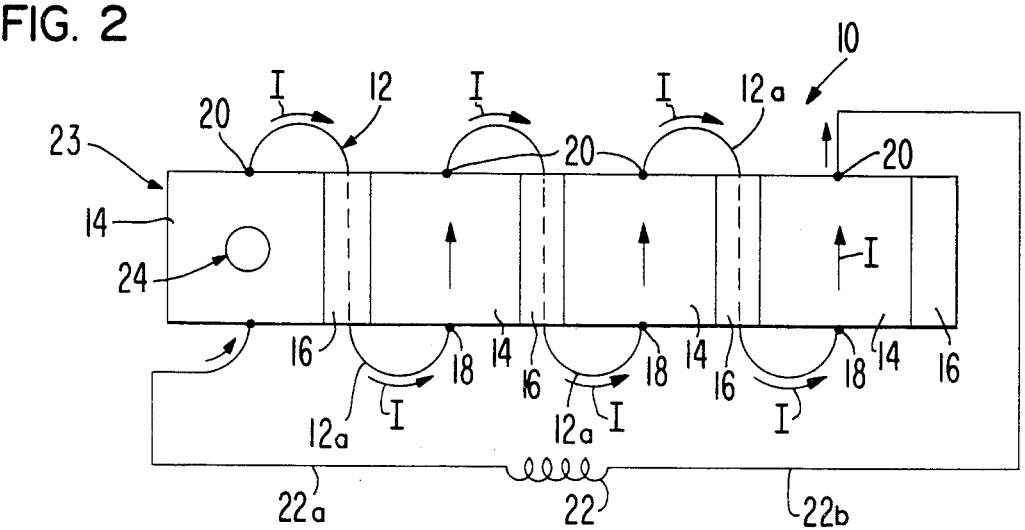
FIG. 2 is a top view of a portion of a flux pump illustrating four gates making up a module in a circuit comprised of superconducting wires connected to a plurality of gates in the form of thin superconducting foils of relatively low critical field.
Figure 3:
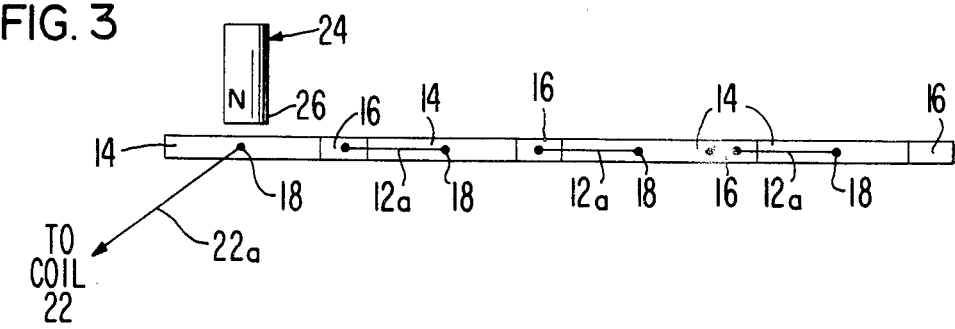
FIG. 3 is an end elevational view of the portion of the flux pump of FIG. 2.

A basic form of the magnetic flux pump of this invention is broadly denoted by the numeral 10 and is illustrated in FIGS. 2 and 3. Flux pump 10 includes the following: a superconducting wire 12 of a material having a relatively high critical field characteristic, such as $Nb_3Sn$ or NbTi; a plurality of aligned gates 14 of a material having a relatively low critical field characteristic, such as niobium or lead; a plurality of strips 16 of insulation material, such as an epoxy, between the gates to separate the same and couple them together in side-by-side relationship as shown in FIG. 2, (the assembly of gates 14 being referred to as a module); a coil 22 of high critical field material has coupling wires 22a L and 22b coupled at their ends to the end gates of the assembly; and a magnetic field source 24. While only a single module has been shown in FIGS. 2 and 3, in practice, there will be more of them than have been illustrated.

Wire 12 is connected at opposed ends of each gate, specifically at upstream and downstream end points 18 and 20 thereof (FIG. 2). The current path through each gate, i.e., the path extending between end points 18 and 20, is transverse to the alignment of the gates. The wire has a wire portion 12a interconnecting the normally downstream end point 20 of one gate module 16 with the upstream end point 18 of the next adjacent module, assuming that electrical current flows to each gate module through the end point 18 thereof. Wire portion 12a, in extending between these two gate modules, can either pass around or through and thus be carried by the corresponding insulation strip 16. Thus, current flowing in wire 12 from end point 20 to end point 18 of each gate 14 will then move through the corresponding insulation strip 16 in a direction opposite to the direction of current flow through the preceding gate.

The current will then enter the next adjacent foil module at upstream end point 18 thereof and flow in the same direction through the gate module as it did in the preceding gate module. This current flow pattern continues throughout the group of gate modules until finally the current flows out of the last gate module of the group and coil 22 and back to the first gate module.

The module consisting of wire 12 and gates 14, such module being denoted by the numeral 23, moves relative to magnetic field source 24, the latter including magnetic means having pole 26 on one side of module 2. For purposes of illustration, source 24 is a permanent magnet as shown in FIG. 3. Either the magnet can move and module 23 be fixed, or the magnet can be fixed and the module can move. In one practical embodiment, module 23 will be in the form of a rotor and have first means (not shown) for mounting the assembly for rotation about a central axis therethrough and second means (not shown) for rotating the assembly about its central axis. This will be more fully described hereinafter.

As the assembly moves relative to the source of magnetic field, superconducting current will flow in wire 12. However, as the magnetic field of the source crosses each gate, the latter will conduct current in the normal fashion because the source magnetic field over the gate exceeds its relatively low critical field characteristics of the gate material. The current will flow through and out of each gate in one direction, through a wire portion 12a in the opposite direction, and then into the next gate 14 in the same direction as the current flow in the preceeding gate module. As module 23 continues to move relative to the magnetic field source, the magnetic field will energize succeeding gates and will cause electrical current to flow in a normal fashion through the gates in the same direction as that of current flow through preceding gates. In this way, magnetic flux is pumped or trapped in the superconducting circuit and the flux is used to excite coil 22, all of which is accomplished without generating countercurrents, especially when the modules are connected together to increase the pumping action. Thus, a relatively small magnetic field source can be used to provide rapid excitation or de-excitation of the coil.

Figure 5:
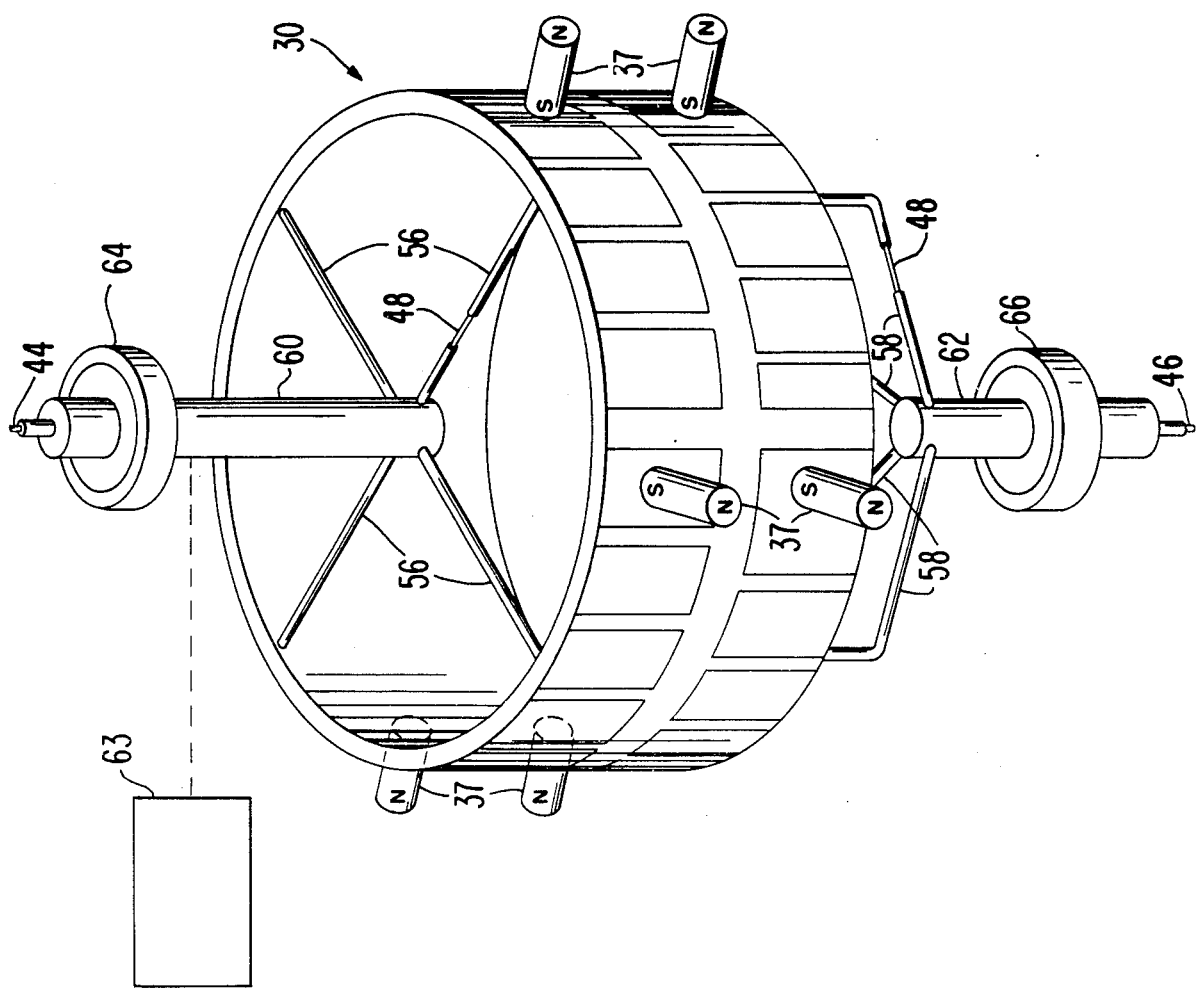
FIG. 5 is a perspective view of the arrangement of FIG. 4 in a cylindrical form.

FIGS. 4 and 5 illustrate the way in which a number of groups of superconducting gate modules can be arranged in a circular pattern with superconducting wires to form a rotor 30 mounted for rotation about a central axis relative to one or more stationary magnets 37. FIG. 4 is a flattened view of the rotor and illustrates that rotor 30 has four groups 36, 38, 40, and 42 of modules, each group having two rows of modules. In FIGS. 4 and 5, a coil 32 is shown as being coupled at its ends to common wires 44 and 46 connected to the wires 48, 50, 52 and 54 of respective module groups 36, 38, 40 and 42. The gates and wires are mounted in a generally rigid, circular band 39 of insulation material of suitable strength to withstand the centrifugal reaction forces thereon. However, when the source magnets 37 rotate and the module groups are stationary, the strength factor in the module assembly is not as critical.

The rotor has upper and lower radial, tubular braces 56 and 58 coupled to respective axial tubes 60 and 62 rotatably carried by bearings 64 and 66 connected to a suitable support (not shown), whereby rotor 30 can rotate about its central axis. Wires 48, 50, 52 and 54 extend through braces 56 and 58, and wires 44 and 46 extend through tubes 60 and 62. Coil 32 is carried in any suitable manner by the support. Means 63 coupled with tube 60 is provided to rotate the rotor about its central axis.

The wire connections to the gates in each module are as shown in FIG. 4. For instance, wire 48 passes to one end point 49 of the first gate 14 and a first wire portion 48a passes from the opposite end point 51 of gate 14, through insulating band 39 to the upstream end point 49 of the next gate 14a. Then a second wire portion 48b passes from opposite end point 51 of gate 14a through insulation band 39 to the end point 49 of another gate 14b, following which another wire portion 48c connects the opposite end point 51 of gate 14b with the upstream end point of another gate 14c and so on. Finally, wire 48 is directed from the downstream end point 51 of the last gate 14d of the corresponding module and is connected to common wire 44. The other gates of module groups 38, 40 and 42 are coupled together in the same way as the interconnection of gates described above with respect to the group 36.

As shown in FIGS. 4 and 5 there is a magnetic field source for each of the modules of the two rows of groups of modules with the south pole of each source adjacent to one side of the groups of modules and the north pole spaced from the modules (FIG. 4). Thus, for n rows, there would need to be n times as many poles as for one row. A pair of magnets 37 are shown for each module of each group in FIG. 5. While a pair of magnets has been shown for each module group, it is clear that a single, axially extending magnet or a number of magnets arranged at circumferential locations about the rotor can be used.

If, however, the magnets are not arranged as is shown in FIGS. 4 and 5, i.e., with the south poles adjacent to the modules and the north poles spaced from the modules, but there is a north pole of one magnet and a south pole of another magnet adjacent to their respective rows as is shown in FIG. 6, the wiring of the foil modules will be as shown in the latter figure instead of being as shown in FIG. 3. In such a case, wire 48, for instance, has its wire portion 48a extending to the end point of foil module 36 which was previously the downstream end point (FIG. 4) thereof, but which is now the upstream end point. In all cases, the wire portions extend through the insulation band separating the various foil modules.

While only two rows of gate modules have been shown for each of the four groups in FIGS. 4, 5 and 6, it is clear that additional rows can be used to decrease the time of pumping. Also, the number of foil modules can be increased in each row to increase pumping speed.

What is claimed is:

1. A magnetic flux pump comprising: a rotor having a plurality of circumferentially spaced superconducting gates mounted thereon, and a superconducting wire means electrically coupling the gates together, each gate being of a material having a relatively low critical field characteristic, each gate further having an upstream end and a downstream end and a current path extending between said ends, the current paths of said gates extending axially of the central axis of said rotor, said wire means being of a material having a relatively high critical field characteristic, said wire means further having wire portions connecting the downstream end of each gate to the upstream end of the next adjacent gate to permit current flow through the gates in substantially one direction; means coupled with said rotor for mounting the same for rotation about its central axis; a source of magnetic field adjacent to said rotor and disposed to cause the gates to intersect the magnetci field thereof as the rotor rotates about its central axis, whereby an electrical current is induced normally in the gates; a coil adjacent to said rotor and coupled with said wire means to form a circuit with the wire means and said gates; and means coupled with said rotor for rotating the same about said central axis.

2. A magnetic flux pump as set forth in claim 1, wherein the rotor has a continuous band of insulation material, said gates being mounted on said band at circumferentially spaced locations thereon, said wire means having wire portions carried by said band.

3. A magnetic flux pump as set forth in claim 2, wherein said gates are mounted on said band in a pair of annular rows, the current path through the gates of said rows being in the same direction, said magnetic field source including a magnet for each row, respectively.

4. A magnetic flux pump as set forth in claim 1, wherein the rotor includes a tube extending along the central axis of the rotor, a number of tubular braces extending radially from the axis, and a generally continuous band of insulation material carried on the outer ends of said braces in surrounding relationship to said central axis, said gates being mounted on said band at circumferentially spaced locations thereon, said wire means having portions extending through said tube and said braces for connection with said coil.

5. A magnetic flux pump as set forth in claim 4, wherein said magnetic field source comprises a fixed magnetic structure having poles on one side of the band.

6. A magnetic flux pump as set forth in claim 4, wherein the magnetic field source includes a number of spaced magnets at circumferentially spaced location along the band.

7. A magnetic flux pump comprising; a coil having coupling wires and forming part of a circuit; a plurality of superconducting modules containing a number of spaced gates of a material having a relatively low critical field characteristic; means mounting the gates in a row in spaced relationship to each other, each gate having an upstream end and a downstream end and a current path extending between said ends, the upstream ends of the gates being on one side of the row and the downstream ends being on the opposite side of the row so that the current paths of said gates extend transversely of the row; a superconducting wire means of a material having a relatively high critical field characteristic, said wire means electrically coupling the ends of said gates together with the downstream end of each gate connected to the upstream end of the next adjacent gate to permit current flow through the coupling wires in substantially one direction; and a source of magnetic field movable relative to and along said row successively across said gates to induce an electrical current normally in each gate.

8. A magnetic flux pump as set forth in claim 7, wherein the mounting means includes a strip of insulation material between each pair of adjacent gates, respectively, said wire means having portions carried by at least certain of the insulation strips.

9. A magnetic flux pump as set forth in claim 7, wherein said mounting means comprises a continuous band of insulation material with the gates disposed at spaced locations along the length of the band.

10. A magnetic flux pump comprising: a coil having coupling wires and forming a part of a circuit; a rotor having a plurality of circumferentially spaces superconducting modules containing a number of spaced gates mounted thereon; a superconducting wire means electrically coupling the gates together, each gate being of a material having a relatively low critical field characteristic, each gate further having an upstream end and a downstream end and a current path extending betweeen said ends, the current paths of said gates extending axially of the central axis of said rotor, said wire means being of a material having a relatively high critical field characteristic, said wire means further having wire portions connecting the downstream end of each gate to the upstream end of the next adjacent gate to permit current flow through the coupling wires in substantially one direction; means coupled with said rotor for mounting the same for rotation about its central axis; a source of magnetic field adjacent to said rotor and disposed to cause the gates to intersect the magnetic field thereof as the rotor rotates about its central axis, whereby an electrical current is induced normally in the gates; and means coupled with said rotor for rotating the same about said central axis.

11. A magnetic flux pump as set forth in claim 10, wherein the rotor has a continuous band of insulation material, said gates being mounted on said band at circumferentially spaced locations thereon, said wire means having wire portions carried by said band.

12. A magnetic flux pump comprising: a plurality of superconducting gates of a material having a relatively low critical field characteristic; means mounting the gates in first and second rows with the gates in each row being in spaced relationship to each other and the second row of gates extending longitudinally of the first row of gates, each gate having an upstream end and a downstream end and a current path extending between said ends, the upstream ends of the gates being on one side of the row and the downstream ends being on the opposite side of the row so that the current paths of said gates extend transversely of the row, the current paths through the gates being the same direction; a superconducting wire means of a material having a relatively high critical field characteristic, said wire means electrically coupling the ends of said gates together with the downstream end of each gate connected to the upstream end of the next adjacent gate to permit current flow through the gates in substantially one direction; a magnet for each row, respectively, each magnet being movable relative to and along the respective row successively across said gates thereof to induce an electrical current normally in each gate of the respective row; and a coil coupled with said wire means to form a circuit with the latter and said gates.

13. A magnetic flux pump comprising: a plurality of superconducting gates of a material having a relatively low critical field characteristic; a circular band of insulating material; means mounting the band for rotation about its central axis to form a rotor, the gates being mounted in spaced relationship on the band, each gate having an upstream end and a downstream end and a current path extending between said ends, the current paths extending axially of said central axis, the upstream ends of the gates being on one side of the row and the downstream ends being on the opposite side of the row so that the current paths of said gates extend transversely of the row; a superconducting wire means of a material having a relatively high critical field characteristic, said wire means electrically coupling the ends of said gates together with the downstream end of each gate connected to the upstream end of the next adjacent gate to permit current flow through the gates in substantially one direction; a source of magnetic field movable relative to and along said row successively across said gates to induce an electrical current normally in each gate; means coupled with the rotor for rotating the same relative to said magnetic field source; and a coil coupled with said wire means to form a circuit with the latter and said gates.

14. A magnetic flux pump as set forth in claim 13, wherein said magnetic field source comprises a fixed magnetic structure having a pole external of the rotor, the magnetic field thereof being intersected by the gates as the rotor is rotated about its central axis.

15. A magnetic flux pump as set forth in claim 13, wherein the magnetic field source includes a number of spaced magnets at circumferentially spaced locations along the rotor.

16. In a magnetic flux pump, an assembly including: a plurality of superconducting gates of a material having a relatively low critical field characteristic; a circular band of insulation material; means mounting the band for rotation about its central axis, the gates being mounted in spaced relationship on the band, each gate having an upstream end and a downstream end and a current path extending between said ends, the current paths through the gates extending axially of said central axis, the upstream ends of the gates being on one side of the row and the downstream ends being on the opposite side of the row so that the current paths of said gates extend transversely of the row; a superconducting wire means of a material having a relatively high critical field characteristic, said wire means electrically coupling the ends of said gates together with the wire means connecting the downstream end of each gate to the upstream end of the next adjacent gate to permit current flow through the gates in substantially one direction, said assembly adapted to be moved relative to a source of magnetic field so that the gates can successively intersect the field to cause an electrical current to be induced in the gates; and an inductor coupled with said wire means to form a circuit with the latter and said gates.

17. A magnetic flux pump comprising a coil having a coupling wires and forming part of a circuit; a plurality of superconducting modules defining first and second rows of modules, the second row extending longitudinally of the first row, each module having a number of spaced gates of a material having a relatively low critical field characteristic; means mounting the gates in a row in spaced relationship to each other, each gate having an upstream end and a downstream end and a current path extending between said ends, the upstream ends of the gates being on one side of the row and the downstream ends being on the opposite side of the row so that the current paths of said gates extend transversely of the row, the current paths through the gates of the modules being in the same direction; a superconducting wire means of a material having a relatively high critical field characteristic, said wire means electrically coupling the ends of said gates together with the downstream end of each gate connected to the upstream end of the next adjacent gate to permit current flow through the coupling wires in substantially one direction; and a magnet for each row of modules, respectively, each magnet being movable relative to and along the respective row successively across said gates to induce an electrical current normally in each gate of the respective row.

18. A magnetic flux pump comprising a coil having coupling wires and forming pat of a circuit; a plurality of superconducting modules containing a number of spaced gates of a material having a relatively low critical field characteristic; a circular band of insulation material adapted to be mounted for rotation about its central axis to form a rotary, the gates being mounted in spaced relationship on the band, each gate having an upstream end and a downstream end and a current path extending between said ends, the current paths through the gates extending axially of the central axis of the rotor, the upstream ends of the gates being on one side of the row and the downstream ends being on the opposite side of the row so that the current paths of said gates extend transversely of the row, a superconducting wire means of a material having a relatively high critical field characteristic, said wire means electrically coupling the ends of said gates together with the downstream end of each gate connected to the upstream end of the next adjacent gate to permit current flow through the coupling wires in substantially one direction; a source of magnetic field movable relative to and along said row successively across said gates to induce an electrical current normally in each gate; and means coupled with the rotor for rotating the same relative to said magnetic field source.

19. A magnetic flux pump as set forth in claim 18, wherein said magnetic field source comprises a fixed magnetic structure having a pole external of the rotor, the magnetic field thereof being intersected by the gates as the rotor is rotated about its central axis.

20. A magnetic flux pump set forth in claim 18, wherein the magnetic field source includes a number of spaced magnets at circumferentially spaced locations along the rotor.

21. A magnetic flux pump comprising a coil having coupling wires and forming a part of a circuit; a continuous band of insulation material defining a rotor having a plurality of circumferentially spaced superconducting modules in repsective annular rows thereon, each module having a number of spaced gates mounted on said band at circumferentially spaced locations thereon, a superconducting wire means electrically coupling the gates together, each gate being of a material having a relatively low critical field characteristic, each gate further having an upstream end and a downstream end and a current path extending between said ends, the current paths of said gates of said rows being in the same direction and extending axially of the central axis of said rotor, said wire means being of a material having a relatively high critical field characteristic, said wire means further having wire portions connecting the downstream end of each gate to the upstream end of the next adjacent gate to permit current flow through the coupling wires in substantially one direction, means coupled with said rotor for mounting the same for rotation about its central axis; a magnet for each row, respectively, each magnet being adjacent to said rotor and disposed to cause the respective gates to intersect the magnetic field thereof as the rotor rotates about its central axis, whereby an electrical current is induced normally in the gate of the respective row; and means coupled with said rotor for rotating the same about said central axis.

22. A magnetic flux pump comprising a coil having a coupling wires and forming a part of a circuit; a rotor having a plurality of circumferentially spaced superconducting modules with each module containing a number of spaced gates, the rotor including a tube extending along the central axis of the rotor, a number of tubular braces extending radially from the axis, and a generally continuous band of insulation material carried on the outer ends of said braces in surrounding relationship to said central axis, said gates being mounted on said band at circumferentially spaced locations thereon; a superconducting wire means electrically coupling the gates together, each gate being of a material having a relatively low critical field charactersistic, each gate further having an upstream end and a downstream end and a current path extending between said ends, the current paths of said gates extending axially of the central axis of said rotor, said wire means being of a material having a relatively high critical field characteristic, said wire means having wire portions connecting the downstream end of each gate to the upstream end of the next adjacent gate to permit current flow through the coupling wires in substantially one direction, said wire means further having portions extending through said tube and said braces and connected with with said coil; means coupled with said rotor for mounting the same for rotation about its central axis, a source of magnetic field adjacent to said rotor and disposed to cause the gates to intersect the magnetic field thereof as the rotor rotates about its central axis, whereby an electrical current is induced normally in the gates; and means coupled with said rotor for rotating the same about said central axis.

23. A magnetic flux pump as set forth in claim 22, wherein said magnetic field source comprises a fixed magnetic structure having poles on one side of the band.

24. A magnetic flux pump as set forth in claim 22, wherein the magnetic field source includes a number of spaced magnets at circumferentially spaced locations along the band.

25. A magnetic flux pump comprising: a plurality of superconducting gates of a material having a relatively low critical field characteristic; means including a strip of insulation material between each pair of adjacent gates respectively, for mounting the gates in a row in spaced relationship to each other, each gate having an upstream end and a downstream end and a current path extending between said ends, the upstream ends of the gates being on one side of the row and the downstream ends being on the opposite side of the row so that the current paths of said gates extend transversely of the row; a superconducting wire means having portions carried by at least certain of the insulation strips and being of a material having a relatively high critical field characteristic, said wire means electrically coupling the ends of said gates together with the downstream end of each gate connected to the upstream end of the next adjacent gate to permit current flow through the gates in substantially one direction; and a source of magnetic field movable relative to and along said row successively across said gates to induce an electrical current normally in each gate; and a coil coupled with said wire means to form a circuit with the latter and said gates.

26. A magnetic flux pump comprising: a plurality of superconducting gates of a material having a relatively low critical field characteristic; means including a continuous band of insulation material for mounting the gates in a row at spaced locations along the length of the band, each gate having an upstream end and a downstream end and a current path extending between said ends, the upstream ends of the gates being on one side of the row and the downstream ends being on the opposite side of the row so that the current paths of said gates extend transversely of the row; a superconducting wire means of a material having a relatively high critical field characteristic, said wire means electrically coupling the ends of said gates together with the downstream end of each gate connected to the upstream end of the next adjacent gate to permit current flow through the gates in substantially one direction; and a source of magnetic field movable relative to and along said row successively across said gates to induce an electrical current normally in each gate; and a coil coupled with said wire means to form a circuit with the latter and said gates.

27. In a magnetic flux pump, an assembly including: a plurality of superconducting gates of a material having a relatively low critical field characteristic; means including a strip of insulation material between each pair of adjacent gates, respectively, for mounting the gates in spaced, aligned relationship to each other, each gate having an upstream end and a current path extending between said ends. The upstream ends of the gates being on one side of the row and the downstream ends being on the opposite side of the row that the current paths of said gates extend transversely of the row; a superconducting wire means having portions carried by at least certain of the insulation strips and being of a material having a relatively high critical field characteristic, said wire means electrically coupling the ends of said gates together with the wire means connecting the downstream end of each gate to the upstream end of the next adjacent gate to permit current flow through the gates in substantially one direction, said assembly adapted to be moved relative to a source of magnetic field so that the gates can successively intersect the field to cause an electrical current to be induced in the gates; and an inductor coupled with said wire means to form a circuit with the latter and said gates.

28. In a magnetic flux pump, an assembly including: a plurality of superconducting gates of a material having a relatively low critical field characteristic; means including a continuous band of insulation material for mounting the gates at spaced locations along the length of the band, each gate having an upstream end and a downstream end and a current path extending between said ends, the upstream ends of the gates being on one side of the row and the downstream ends being on the opposite side of the row so that the current paths of said gates extend transversely of the row; a superconducting wire means of a material having a relatively high critical field characteristic, said wire means electrically coupling the ends of said gates together with the wire means connecting the downstream end of each gate to the upstream end of the next adjacent gate to permit current flow through the gates in substantially one direction, said assembly adapted to be moved relative to a source of magnetic field so that the gates can successively intersect the field to cause an electrical current to be induced in the gates; and an inductor coupled with said wire means to form a circuit with the latter and said gates.

* * * * *